United States Patent
Ku et al.

(10) Patent No.: US 6,557,399 B1
(45) Date of Patent: May 6, 2003

(54) ADVANCED GLIDEHEAD SENSOR FOR SMALL SLIDER

(75) Inventors: Chiao-Ping Ku, Fremont, CA (US); Bruno Jean Marchon, Palo Alto, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 31 days.

(21) Appl. No.: 09/981,533

(22) Filed: Oct. 16, 2001

Related U.S. Application Data

(62) Division of application No. 09/122,194, filed on Jul. 23, 1998, now Pat. No. 6,314,799
(60) Provisional application No. 60/053,781, filed on Jul. 25, 1997.

(51) Int. Cl.[7] .............................. G01B 7/34; G01B 5/28
(52) U.S. Cl. ........................................ 73/105; 29/23.35
(58) Field of Search ........................ 73/105; 360/234.3, 360/235.1, 110; 310/328, 330, 331, 332; 29/23.35, 603.01, 603.07, 603.09

(56) References Cited

U.S. PATENT DOCUMENTS

| | | | |
|---|---|---|---|
| 5,581,021 A | | 12/1996 | Flechsig et al. .............. 73/105 |
| 5,872,311 A | * | 2/1999 | Schaenzer et al. ............ 73/105 |
| 5,942,680 A | * | 8/1999 | Boutaghou ................... 73/105 |
| 6,196,062 B1 | * | 3/2001 | Wright et al. ................. 73/105 |

OTHER PUBLICATIONS

Bharat Bhusan, Advances in Information Storage Systems, 1993, pp. 211–236, vol. 5, Asme Press, New York, USA.

Imai, et al., JSME International Journal, 1997, pp. 33–41, Series C, vol. 40, No. 1, Japan.

* cited by examiner

*Primary Examiner*—Daniel S. Larkin
(74) *Attorney, Agent, or Firm*—LaRiviere, Grubman & Payne, LLP

(57) ABSTRACT

A disk surface asperities tester including a glidehead member having a piezoelectric sensor fabricated directly on the glidehead member. The piezoelectric sensors are useful in applications utilizing 70%, 50%, 30%, or smaller glideheads. The invention discloses a method for manufacturing sensors utilizing microchip fabrication techniques to form the piezoelectric sensors directly on glidehead surfaces, including standard $Al_2O_3$.TiC glideheads. The fabricated piezoelectric sensors are used in combination with signal processors to detect and analyze asperities in a disk drive surface.

7 Claims, 3 Drawing Sheets

ADVANCED GLIDEHEAD SENSOR FOR SMALL SLIDER

RELATED APPLICATION(S)

This application is a divisional patent application claiming priority to U.S. patent application Ser. No. 09/122,194 entitled "ADVANCED GLIDEHEAD SENSOR FOR SMALL SLIDER," filed Jul. 23, 1998, now U.S. Pat. No. 6,314,799, by the same applicants, which in turn claims priority from U.S. Provisional patent application Ser. No. 60/053,781 filed Jul. 25, 1997, also entitled "ADVANCED GLIDEHEAD SENSOR FOR SMALL SLIDER."

BACKGROUND OF THE INVENTION

The present invention relates to an apparatus for surface analysis of a recording surface. In particular, it relates to an apparatus for measuring head-disk contact using piezoelectric glidehead sensors. Most particularly, the present invention relates to piezoelectric sensors which are formed using microcircuit fabrication methods.

In a conventional magnetic storage drive, an air bearing slider supports a magnetic transducer in close proximity to a moving recording surface. Typically, the recording surface comprises a rigid disk coated with a layer of magnetic material. To assure long-term reliability and integrity the coated disks must be free of surface asperities at the head/disk interface. This is critical because asperities may lead to undesirable head/disk contact or "head crash".

One method of assuring that the disk surface contains no asperities is glide height testing. A slider is flown over the recording disk at a height equal to or below the desired head fly height to analyze impacts between the slider and the disk surface. The present art includes one or more piezoelectric sensors bonded to the slider on an upper surface facing away from the recording surface or bonded onto a "wing" which extends off to the side of the slider. Piezoelectric materials are used because they generate an electric charge in response to stress. As the slider experiences rigid body displacement and flexing deformation, the sensors respond by generating an electric signal which may be monitored.

During the glide test process, the glide head flies over the disk surface at a predetermined clearance from the disk surface, also known as glide height. If contact occurs between the glidehead and a disk asperity or defect, the glidehead is subject to vibration and deformation. The slider deformation results in a piezoelectric sensor (also known as a piezoelectric transducer ("PZT")) deformation. The PZT deformation produces a measurable electric signal which is carried by the electrodes of the PZT to a signal processor. When contact occurs, many vibrational modes of the PZT and slider are excited simultaneously, and each mode generates a voltage at its specific frequency. Typically, these signals are filtered and analyzed. If the magnitude of the analyzed signal exceeds a predetermined threshold level, the disk is rejected.

In recent years, the disk drive industry has been producing storage systems with smaller sliders than the conventional "100%" slider size (e.g., approximately 4 mm long by 3 mm wide). These reductions in slider size (e.g. 70%, 50%, 30%) necessitate a corresponding reduction in the test slider dimensions for an equivalent compliance to the recording surface. Unfortunately, existing PZT's are quite large with respect to the smaller sliders. The excessive weight and size of the PZT sensors causes the results obtained in glide height testing to vary substantially from actual slider performance (i.e., sliders without a PZT sensor). The large size of current PZT sensors causes torquing and imbalances when placed on a wing and causes significant dynamic variations when placed directly over the glidehead. Significantly, the present technology does not produce accurate readings for glideheads smaller than 50%.

Others have recently succeeded in fabricating small ZnO sensors on glideheads. (Imai, et al. JSME International Journal, Series C, Vol. 40, No. 1, 1997). However, these sensors are separately prefabricated and subsequently placed on a silicon glidehead. It is one objective of the present invention to radically reduce the size of the piezoelectric sensors used to measure vibrations induced by disk surface asperities. A further object of the invention is to fabricate the sensor of the present invention directly into $Al_2O_3.TiC$ glideheads. By reducing the size of the sensors and fabricating directly on top of the glidehead, the present invention can be used on smaller glideheads than present technologies and dispense with the need to have a wing on the glidehead. Another objective of the present invention is to adapt microchip fabrication techniques to sensor fabrication. Another object of the present invention is to provide a sensor configuration which delivers an optimal signal to noise ratio and provides the greatest amount of information regarding slider vibration. The radically reduced size of the sensors of the present invention do not significantly alter glidehead performance of reduced size glideheads as does the current art. The present invention provides a small apparatus for analyzing the disk surface for the presence of asperities without significantly altering the vibrational and resonance characteristics of the glidehead.

SUMMARY OF THE INVENTION

Current piezoelectric sensors are often too large when compared to the size of 70%, 50%, and 30% sliders. The increased weight of the sensor often dramatically changes the dynamic characteristics of the slider. Further, if the slider used is a 30% or smaller slider, the smallest current art piezoelectric sensors are simply too large to be used at all.

The present invention uses piezoelectric sensors fabricated directly on a slider using typical microcircuit fabrication techniques. A typical sensor of the present invention is 100 $\mu$m×20 $\mu$m×2 $\mu$m or even smaller. As such, the sensor of the present invention is a fraction of the size of sensors used in current technology. The sensors of the present invention are not limited to silicon glideheads and may be fabricated directly on to $Al_2O_3.TiC$ glideheads.

BRIEF DESCRIPTION OF THE DRAWINGS

The reference numbers are intended to refer to the same elements throughout the drawings.

DETAILED DESCRIPTION OF THE INVENTION

The sensor of the present invention may easily be fabricated using any of the techniques known in the art of microchip fabrication. In fact, due to the relatively large size of the sensors and their interconnects (well in excess of 1 $\mu$m) fabrication processes which are now approaching obsolescence for microchip fabrication find renewed life when used to fabricate the present invention. An example of a typical process flow is illustrated in FIGS. 1A–1E below.

Figure 1A:
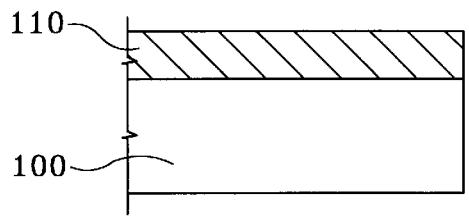
FIGS. 1A–1E illustrate a typical process flow used to fabricate the sensors of the present invention.
Figure 1B:
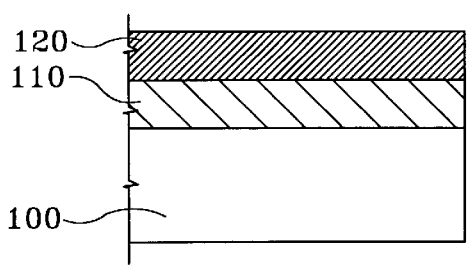

FIG. 1A shows a picoslider (approximately 1.25 mm×1 mm×0.3 mm) in preparation for sensor fabrication. Unlike the invention of Imai, the present invention can be fabricated directly on a standard $Al_2O_3$.TiC slider (100). A thin layer of polysilicon (110) is deposited using low pressure chemical vapor deposition (LPCVD). This layer (110) is typically greater than about 100 Å thick. A second layer comprised of dielectric material (120) is then formed. A preferred embodiment uses a $SiO_2$ formed by thermal oxidation of the polysilicon layer (as shown in FIG. 1B). However, dielectrics, such as silicon nitride, or silicon oxynitride may be deposited using LPCVD to form the dielectric material (120). The dielectric layer (120) is formed to a thickness sufficient to electrically isolate subsequently formed layers from the underlying slider and polysilicon.

Figure 1C:
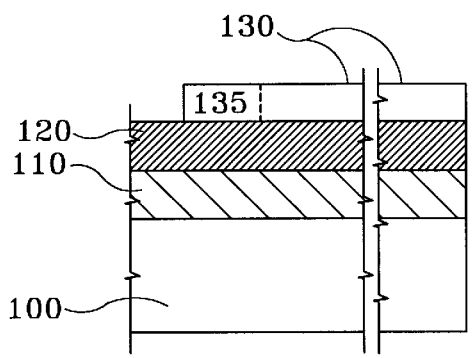

The dielectric layer (120) is pattern masked with photoresist (not shown). The pattern allows the formation of a lower electrode (135) and the lower electrode interconnects (130) (as shown in FIG. 1C). The electrode and interconnects are made of conducting materials which include, but are not limited to, polysilicon, doped polysilicon, suicides, and metals. A preferred material is aluminum.

Figure 1D:
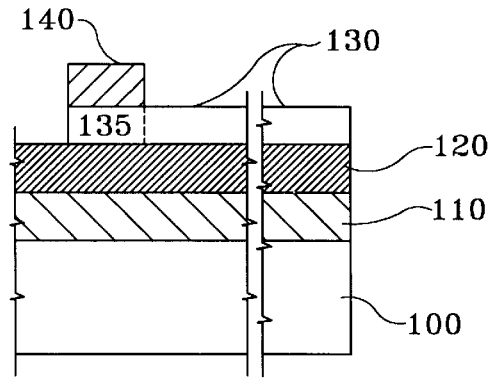

Once the electrodes are formed, the surface is masked again (not shown) and ZnO (140) is sputtered onto the electrode (135) to a thickness of approximately 2 $\mu$m (as shown in FIG. 1D). The mask is removed. Alternatively, pure Zn metal can be sputtered onto the electrode (135). The Zn is later thermally oxidized to form piezoelectric ZnO.

Figure 1E:
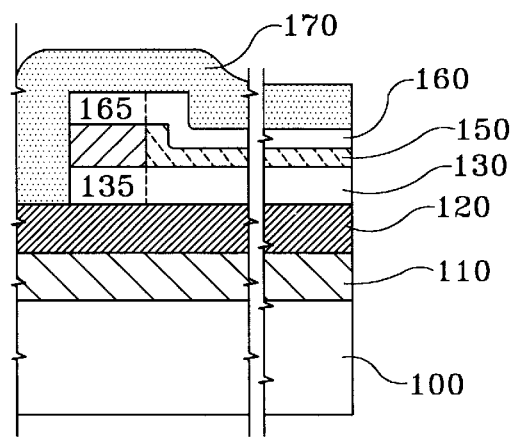
Figure 2A:
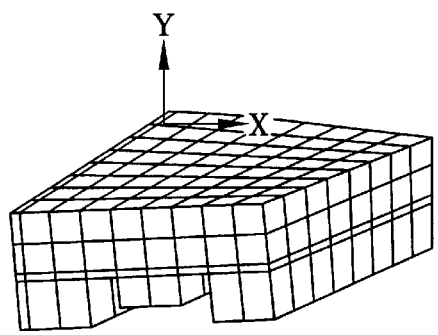
FIGS. 2A–2F show the effects of various contact on a glidehead of the present invention.
Figure 2B:
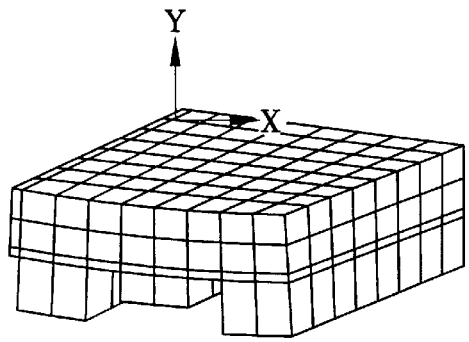
Figure 2C:
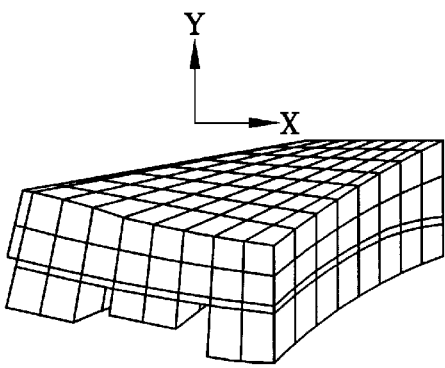
Figure 2D:
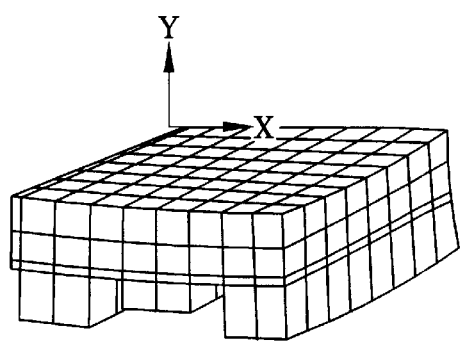
Figure 2E:
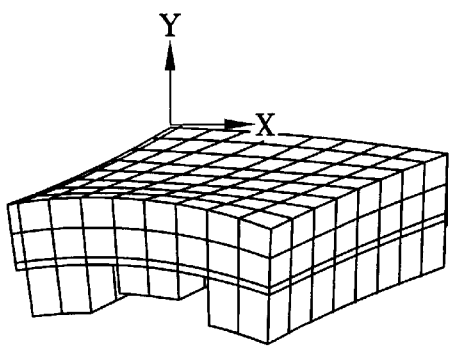
Figure 2F:
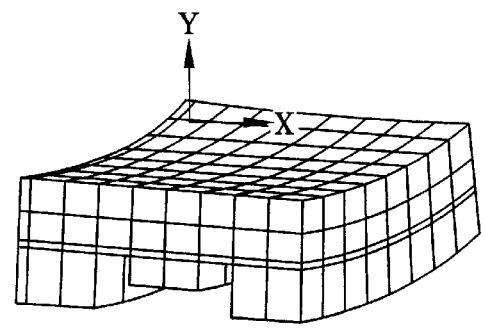

At this point, the ZnO (140) can be masked while an optional layer of electrically isolating material (150) is formed on the surface (as shown in FIG. 1E). This isolating layer prevents subsequently formed interconnects from shorting with the lower electrode interconnects (130). Typically, the isolation layer (150) is comprised of $SiO_2$, but may be practiced using other electrically isolating materials (such as silicon nitride, silicon oxynitride, boropolysilicate glass, etc.). Shorting may also be avoided by forming subsequent interconnects such that they do not overlap with previously formed lower electrode interconnects (130).

The surface is masked again and a layer of electrically conducting material is formed over the ZnO sensor (140), as the top electrode (165), and as top electrode interconnects (160). The preferred material is Al, but any conducting material will serve the purposes of the present invention, including, but not limited to, polysilicon, doped polysilicon, silicides, and metal. Subsequently, the top can be covered with an optional passivation/protection layer (170), which is composed of electrically isolating material, typically comprised of $SiO_2$.

During glidehead testing, asperities in the disk surface collide with the glidehead. These collisions produce a series of dynamic reactions in the glidehead, each of which must be accounted for, measured, and analyzed. FIGS. 2A–2F show a series of glideheads subject to typical deformation patterns caused by impacts with asperities on a disk surface. The X-axis represents horizontal motion with the Y-axis representing vertical motion. Each impact causes vibrational modes in the glidehead. These modes are dependent on how asperities impact and deform a glidehead during use. Each of the torsional and bending shapes depicted have specific natural resonant frequencies (or modes) which may be used to analyze asperities on the disk surface. As can be seen from the wide range of vibrational conformations of FIGS. 2A–2F, sensors must be placed at a variety of locations in order to fully analyze the impact of each asperity.

SPECIFIC SENSOR EMBODIMENTS

Figure 3A:
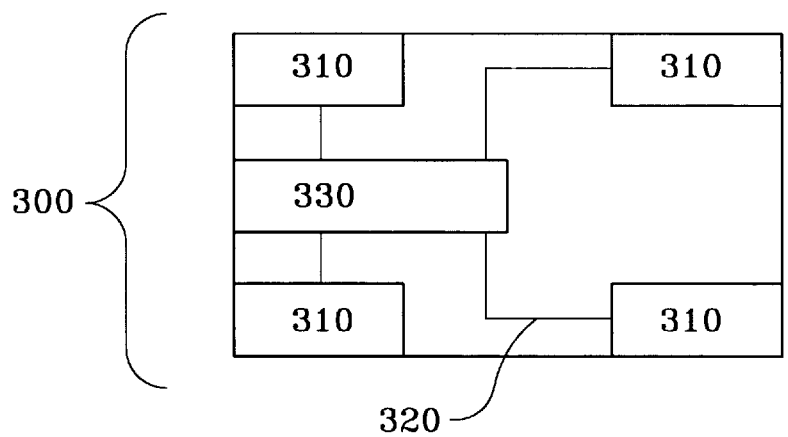
FIGS. 3A and 3B show an embodiment of a sensor array as formed on a glidehead of the present invention.
Figure 3B:
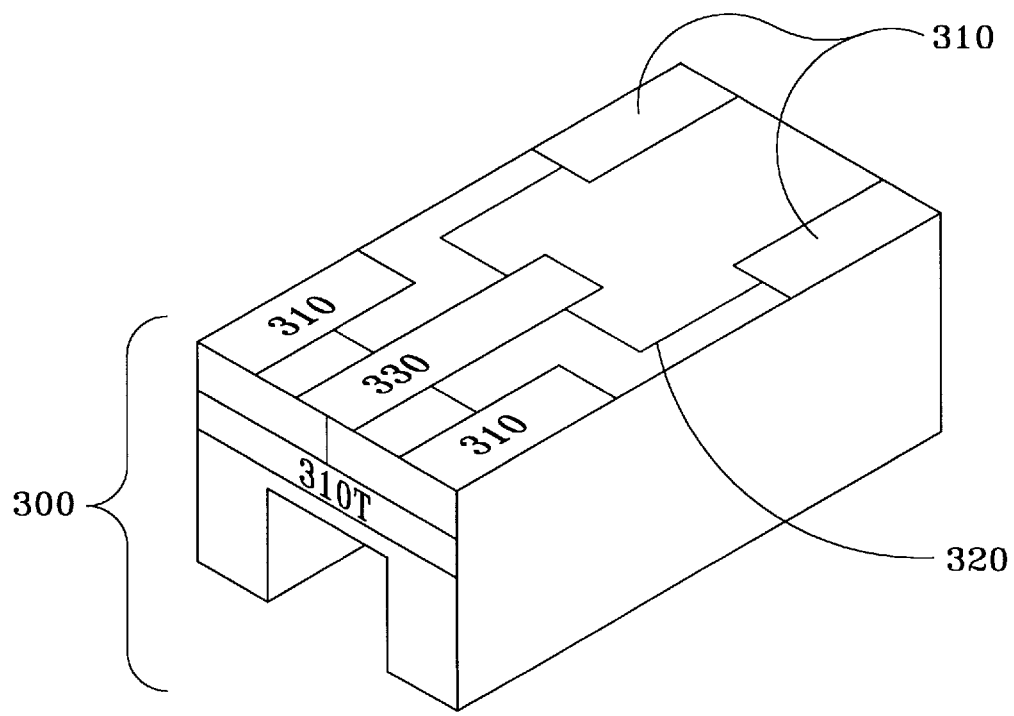

The sensors of the present invention can be fabricated on any surface of the glidehead, but the preferred embodiments construct the sensors on the top and side surfaces of glideheads. FIG. 3A shows an overhead view of a preferred embodiment of the present invention as fabricated by the previously described method. FIG. 3B is a perspective of the same slider and sensors. FIG. 3B shows five ZnO sensors (310, 310T) fabricated on a $Al_2O_3$.TiC slider (300). The corner sensor (310) dimensions are variable and may be as large as 100 $\mu$m×100 $\mu$m×2 $\mu$m, but, typically are 100 $\mu$m×20 $\mu$m×2 $\mu$m. These sensors (310) are each located on or near the four corners of the glidehead. Electrical interconnects (320) connect each sensor to analyzing instrumentation (not shown) through connection site (330). Typically, the bottom electrode (135 of FIG. 1E) is grounded. The top electrode is typically connected to amplification circuits (not shown) which amplify the signal during signal processing. A somewhat larger sensor (310T) may be fabricated and used to detect flexing stress or temperature variation in the slider. The length dimension of this sensor may be quite long, extending nearly the entire width of the slider (300). This sensor is also connected using an interconnect (320). The fabrication methods used to construct sensors (310) are largely the same for sensor (310T). The signals sent by the five sensors can be processed by using any of a number of methods known in the art. A typical example is set forth in U.S. Pat. No. 5,581,021 by Flechsig, et al. Using such methods, the sensors of the present invention sense vibrational response of the sliders to contact with disk asperities, while by careful frequency (or mode) selection the signal-to-noise ratio is enhanced. Such techniques provide an accurate picture of the disk surface.

Although the present invention has been described with reference to certain specific embodiments, it should be understood that numerous substitutions and variations can be made in materials selection, sensor orientation, sensor enhancement, and manufacture without departing from the true nature and scope of the present invention as set forth in the following claims.

What is claimed:

1. A method of fabricating a magnetic disk asperity detector, comprising the steps of:
   (a) providing a glidehead member;
   (b) forming a polysilicon layer on at least one surface of said glidehead member;
   (c) forming a dielectric material layer over said polysilicon layer; and
   (d) forming a piezoelectric sensor structure on said dielectric material layer, thereby fabricating said magnetic disk asperity detector.

2. A method, as recited in claim 1, wherein said glidehead member comprises $Al_2O_3$.TiC material.

3. A method, as recited in claim 1, wherein said piezoelectric sensor structure forming step comprises the step of forming at least one electrode on said dielectric material layer, said at least one electrode comprising a material selected from a group consisting essentially of polysilicon, doped polysilicon, metal, and silicide.

4. A method, as recited in claim 3, wherein said piezoelectric sensor structure forming step further comprises the step of forming an isolation layer of dielectric material over said at least one electrode, said isolation layer comprising a material selected from a group consisting essentially of silicon dioxide, silicon nitride, boropolysilicate glass, and silicon oxynitride.

5. A method, as recited in claim 4, wherein said piezoelectric sensor structure forming step further comprises forming a zinc oxide piezoelectric sensor material on said at least one electrode.

6. A method, as recited in claim 5, wherein said zinc oxide piezoelectric sensor material forming step comprises sputtering zinc oxide onto said at least one electrode.

7. A method, as recited in claim 5, wherein said zinc oxide piezoelectric sensor material forming step comprises the steps of:

(i) sputtering zinc metal onto said at least one electrode; and (ii) thermally oxidizing said zinc metal to create said zinc oxide.

* * * * *